March 3, 1970     R. L. GALLANT     3,497,913
VULCANIZING SYSTEM
Filed June 30, 1967
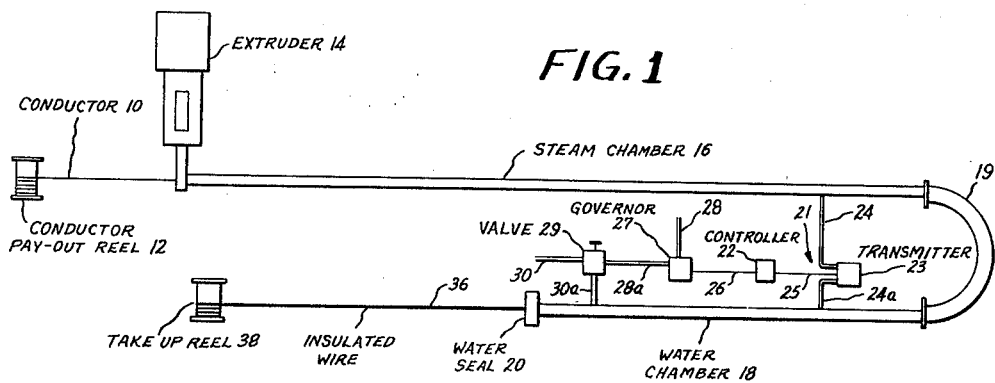
FIG. 1
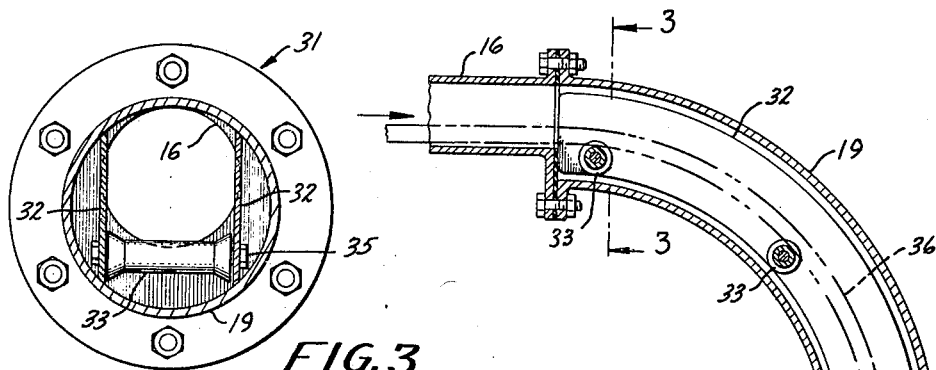
FIG. 3
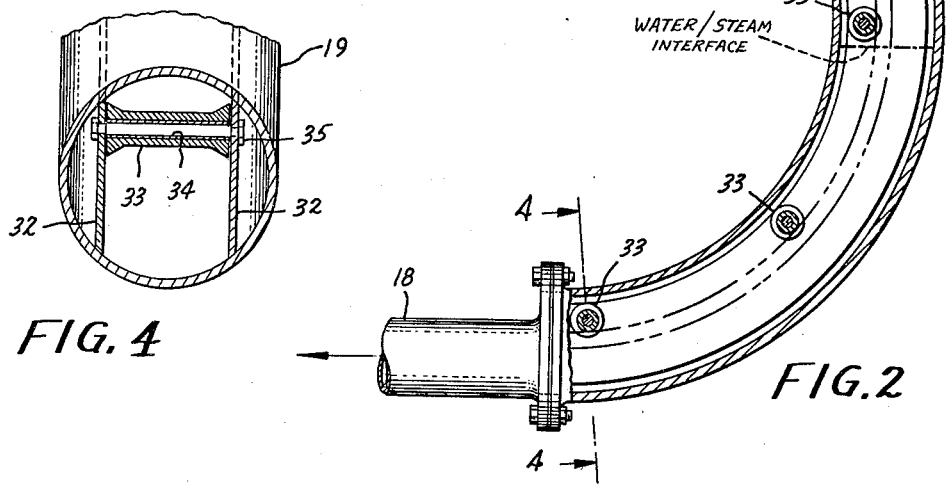
FIG. 4
FIG. 2
INVENTOR.
ROBERT L. GALLANT
BY R. Jonathan Pitts
ATTORNEY

United States Patent Office 3,497,913
Patented Mar. 3, 1970

3,497,913
VULCANIZING SYSTEM
Robert L. Gallant, Nabnasset, Mass., assignor to General
Electric Company, a corporation of New York
Filed June 30, 1967, Ser. No. 650,386
Int. Cl. B29h 5/28
U.S. Cl. 18—6                                                      1 Claim

ABSTRACT OF THE DISCLOSURE

In a vulcanizing system for curing a continuous length of a polymeric composition curable under steam pressure, a first elongated tubular member, maintained under steam pressure, extends from a fabricating means, and a second elongated tubular member is disposed in spaced, longitudinal relationship thereto. A U-shaped tubular member is connected to said first and second tubular members at the end remote from the fabricating means for establishing communication therebetween, whereby the direction of the continuous length in passing from the fabricating means through said first tubular member is reversed and passed through said second tubular member. The second tubular member is filled with water, and a pressure sensing means maintains a steam-water interface in the U-shaped tubular member.

---

This invention relates to a vulcanizing or cure system. In its more specific aspect, this invention relates to a system for curing a continuous length of polymeric composition curable under steam pressure, especially a polyolefin composition.

Although the invention is described hereinafter with particular reference to the manufacture of wire and cable wherein an insulation layer of curable composition is fabricated around a conductor and the insulation composition subsequently cured, it should be understood that the invention is generally applicable to curing a continuous length of a polymeric composition curable under steam pressure.

The terms "wire" and "cable" are used herein and in the appended claims as synonymous terms.

Thermosetting or cross-linked polyolefin compositions such as polyethylene and ethylene-propylene rubber are well known and have been used extensively, especially for insulating materials for wire and cable. In the conventional manufacture of wire and cable employing such insulation materials, the insulation composition is compounded in a preliminary operation, and the curing agent is incorporated with the composition under conditions to minimize or prevent incipient cure. A typical insulation composition may comprise, for example, polyethylene, which may have incorporated therein a filler such as carbon black or a mineral filler as well as other additives, and an organic peroxide curing agent. The insulation composition is continuously fed to an extruder simultaneously with the metal conductor, and an insulation layer is fabricated over the conductor. The formed wire is then passed through a curing chamber which is maintained under steam pressure sufficient to effect substantial curing of the polymer. The insulated wire is then cooled under proper conditions to prevent blistering and then wound on a take-up reel. The wire is formed in a continuous process, and the polymer may be cured or crosslinked under steam pressure of about 150 to 400 p.s.i.g., or higher.

Apparatus employed in the vulcanizing or cure system comprises an elongated tubular member or chamber extending from the extruder. A conventional mechanical seal divides the chamber into two sections, i.e., a steam leg and a water leg. The steam leg is maintained under steam pressure sufficient to effect substantial curing of the polymer, and is substantially longer than the water leg which is filled with water. In a conventional system, the steam leg may be five to ten times the length of the water leg. The mechanical seal for separating these two sections or legs in a standard product available on the market. A typical seal comprises a plurality of rubber discs slotted to accommodate the wire and arranged to stagger the slots. The discs are supported by a housing and maintained under compression by pneumatic pressure. A similar seal may be used at the end of the water leg.

In starting a run, it is necessary to "string up" the wire line. To accomplish this, the metal conductor is "blown down" the steam leg by attaching a suitable cloth wad to the end of the conductor, inserting it into the steam pipe, closing the system and turning on the steam. The steam propels the rag down the stream pipe or leg to the mechanical seal. This seal then must be opened and the conductor threaded therethrough to the water leg. The process is repeated to blow the conductor to the end of the water leg, and the conductor is then attached to the take-up reel, or where the water leg is exceptionally short, the conductor may be worked manually through the leg and then attached to the take-up reel. The extrusion process is then started, and the insulated conductor, upon discharge from the extruder, is passed through the steam leg to effect curing of the polymer, then through the water leg to cool and set the insulation composition thereby avoiding blistering, and then wound on a take-up reel.

The extrusion speed is dependent on the resident time in the steam leg and the pressure. It therefore is desirable to have as long a steam leg as possible within practical limits. Rather than connecting the steam leg and water leg in tandem as described above, one known cure system arranges the legs longitudinally to each other. An autoclave is connected to the steam leg at the end remote from the extruder, and the water leg extends from the autoclave. A capstan is arranged in the autoclave, and the wire drawn through the steam pipe and around the capstan is reversed in direction and passed through the water leg to the take-up reel. This system is advantageous in that the length of the steam leg may be extended to equal that of the steam leg and water leg when connected in tandem wihout occupying any additional floor space in the factory. Because the length of the steam leg is substantially increased, the extrusion speed in fabricating the wire likewise may be increased.

In stringing up the wire line, the string can be blown down to the autoclave chamber only when then has to be opened, and the string again blown down the water leg. In addition, the water-vapor interface maintained in the autoclave chamber is relatively voluminous and condensation may occur. Consequently, a loss in steam pressure in the steam leg may result.

This invention has therefore as its objects to overcome the disadvantages of the cure systems of the prior art and to provide a cure system which is more economical to operate and maintain. These together with other objects and advantages may best be understood by referring to the following detailed description, and to the accompanying drawing in which: FIGURE 1 is a diagrammatic elevational view of a cure system illustrating the present invention; FIGURE 2 is a fragmentary sectional view illustrating in greater detail some of the apparatus of FIGURE 1; FIGURE 3 is a sectional view on line 3—3 of FIGURE 2; and FIGURE 4 is a sectional view on line 4—4 of FIGURE 2.

Referring to the drawings wherein like reference numerals designate similar parts throughout, metal conductor 10 drawn from a pay-out reel 12 is passed to an extruder 14. Simultaneously, insulation compound is fed to the extruder, and an insulation layer is formed continuously over the metal conductor. A steam chamber or leg 16 in the form of an elongated tubular member extends directly from the extruder and the insulated wire is passed from the extruder through the steam chamber. The steam chamber is maintained under sufficient pressure to effect substantial curing of the insulation layer. Typically, this pressure may range from 150 to 400 p.s.i.g., such as used in the curing of a polyethylene insulation layer, but may vary depending upon the type of polymeric material, the thickness of the insulation layer, and the extrusion speed. A water chamber or leg 18 in the form of an elognated tubular member is disposed in spaced, longitudinal relationship to the steam leg 16, and preferably parallel thereto. A substantially U-shaped tubular member or connector 19 is connected to the steam leg 16 and water leg 18 at the ends remote from the extruder, thereby establishing communication between the steam leg and the water leg. The opposite end of the water leg is provided with a conventional seal 20. Pressure sensing elements, indicated generally at 21, regulate the water head so as to maintain a water-vapor interface in the U-shaped tubular member. The pressure sensing element compensates for a change in steam pressure in the steam leg so that the water head is maintained within the U-shaped member thereby avoiding water from entering the steam leg which would result in loss of pressure. In the pressure sensing element, control means 22 is set to give the desired water level or head. Transmitter 23 is responsive to the pressure in the steam leg and water leg through lines 24 and 24a, respectively, and transmits an electrical signal proportional to the differential in pressure to the control means via line 25. If the water level is not correct, an electrical signal from the control means is passed through line 26 to the governor 27 where it is converted to an air pressure signal to permit the admission of air through lines 28 and 28a which in turn activates valve 29. When the valve is opened, water flows to the water leg via lines 30 and 30a.

Referring now to FIGURE 2, the U-shaped tubular member 19 may be attached to the steam leg 16 and the water leg 18 by means of a flange connection 31. Where desired, other connecting means such as a quick opening closure or a C-clamp may be used. As shown in the drawings, the U-shaped tubular member has a diameter substantially greater than that of either the steam leg or the water leg, and two arcuate plates 32 are arranged therein in spaced, parallel relation. A plurality of rollers 33 disposed at spaced intervals are arranged within the U-shaped tubular member and between the arcuate plates 32. The rollers may be held by a threaded shaft 34 and affixed to the arcuate plates by means of a nut 35. The leading and trailing rollers are arranged so that an extension of the inwardly disposed walls of the steam leg and the water leg are at least tangential to, or intersect, the rollers. Preferably, such an extension would intersect each roller between its periphery and longitudinal axis. In this manner, the rollers guide the insulated wire clear of the marginal edges of either leg. This is particularly desirable in that if one or both rollers is not so arranged relative to an extension of the inwardly disposed wall of its respective leg, the insulated wire would drag across the marginal edge of the leg thereby abrading the insulation. It will be observed that the insulated wire 36 is drawn over the rollers which facilitate passage of the wire through the U-shaped connector 19 to the water leg. The number of rollers may vary depending upon such factors as the size of the wire fabricated, the extrusion speed, and the size of the U-shaped connector.

In operation, the insulated wire, upon discharge from the extruder, is drawn through the steam leg maintained under sufficient steam pressure to effect substantial curing of the polymer. The wire then passes over the rollers in the U-shaped connector, which reverses the direction of the wire, and then through the water leg to cool and set the insulation. The resulting product is then wound on a take-up reel 38.

It will be observed that the present invention exhibits numerous advantages. In stringing up the wire line, the conductor to be run in the extruder is blown down the steam pipe, through the U-bend connector and down the water leg. The conductor may then be attached to the take-up reel and is ready for operation. As a consequence, stringing up the wire line is done in one operation and the need for opening any chambers or mechanical seals intermediate the ends of the curing chamber is eliminated. This is accomplished without any sacrifice in length of the steam leg, in that the steam leg may be as long as the combined length of the steam leg and water leg when connected in tandem as practiced in the prior art, and consequently increased extrusion speeds may be achieved with the longer steam leg. Still further, the U-shaped connector is relatively small in cross sectional area compared to that of the autoclave chamber, and therefore any loss in steam pressure is less likely to occur. Because of these advantages, the cure system of the present invention is more economical and less costly to maintain than a comparable system employing an autoclave chamber or mechanical seal between the steam leg and the water leg.

I claim:

1. In a vulcanizing system for curing a continuous length of a polymeric composition curable under steam pressure, comprising: means for fabricating said length; a first elongated tubular member extending from said fabricating means and adaptable for passage therethrough of said continuous length; means for maintaining said first member under steam pressure sufficient to effect substantial curing of said continuous length; a second elongated tubular member in spaced, parallel, longitudinal relation to said first member and adaptable for passage therethrough of said continuous length; means for maintaining water within said second tubular member; a third tubular member having a substantially U-shaped configuration connected between said first and second tubular members at the end remote from said fabricating means for establishing communication between said first and second members, whereby the direction of said continuous length in passing from said first to second member is reversed; two arcuate plates disposed in said third tubular member in spaced, parallel relation; a plurality of rollers disposed at spaced intervals between said plates and affixed thereto whereby said continuous length in passing from said first tubular member is passed over said rollers; and wherein the leading and trailing rollers are arranged relative to an extension of the inwardly disposed walls of said first and second tubular members so that the periphery of the rollers guides the wire passing therethrough clear of the marginal edges of said first and second tubular members; and a pressure sensing means to maintain a steam-water interface in said third member.

References Cited

UNITED STATES PATENTS

| | | |
|---|---|---|
| 2,069,087 | 1/1937 | Fostrom et al. |
| 2,092,306 | 9/1937 | Fuelnegg et al. |
| 2,478,616 | 8/1949 | Adams et al. |
| 2,952,870 | 9/1960 | Marls. |
| 2,987,768 | 6/1961 | Given. |
| 3,119,147 | 1/1964 | Kracht. |

WILLIAM J. STEPHENSON, Primary Examiner